United States Patent
Lisseck

(10) Patent No.: US 10,218,212 B2
(45) Date of Patent: Feb. 26, 2019

(54) SYSTEM AND APPARATUS FOR INDUCTIVE CHARGING OF A HANDHELD DEVICE

(71) Applicant: The Gillette Company LLC, Boston, MA (US)

(72) Inventor: Lutz Lisseck, Schwalbach am Taunus (DE)

(73) Assignee: The Gillette Company LLC, Boston, MA (US)

(*) Notice: Subject to any disclaimer, the term of this patent is extended or adjusted under 35 U.S.C. 154(b) by 239 days.

(21) Appl. No.: 15/379,768

(22) Filed: Dec. 15, 2016

(65) Prior Publication Data

US 2017/0302096 A1    Oct. 19, 2017

Related U.S. Application Data

(60) Provisional application No. 62/322,821, filed on Apr. 15, 2016.

(51) Int. Cl.

| | |
|---|---|
| *H02J 7/00* | (2006.01) |
| *H02J 7/02* | (2016.01) |
| *H02J 50/12* | (2016.01) |
| *H02J 7/06* | (2006.01) |
| *H02J 50/60* | (2016.01) |
| *H02J 7/10* | (2006.01) |

(52) U.S. Cl.
CPC ............. *H02J 7/025* (2013.01); *H02J 7/06* (2013.01); *H02J 50/12* (2016.02); *H02J 50/60* (2016.02); *H02J 2007/10* (2013.01)

(58) Field of Classification Search
CPC ........................................... H02J 7/025
USPC ........................................ 320/108
See application file for complete search history.

(56) References Cited

U.S. PATENT DOCUMENTS

| | | | |
|---|---|---|---|
| 6,456,883 B1* | 9/2002 | Torgerson | A61N 1/08 607/32 |
| 6,549,807 B1* | 4/2003 | Kroll | A61N 1/378 607/34 |

(Continued)

FOREIGN PATENT DOCUMENTS

EP        0558316        9/1993

OTHER PUBLICATIONS

PCT International Search Report with Written Opinion in corresponding international application No. PCT/US2017/025675 dated Jun. 12, 2017.

*Primary Examiner* — Yalkew Fantu
(74) *Attorney, Agent, or Firm* — John M. Lipchitz

(57) ABSTRACT

Included are embodiments of a wireless charging device. Some embodiments include a transmitting side resonant tank circuit that includes a transmitting side tank capacitor and a primary transmission coil. Also included is a bridge component that is coupled to the transmitting side resonant tank circuit for driving the transmitting side resonant tank circuit. The bridge component may be configured to receive a voltage from a power supply for supplying a rail of the transmitting side resonant tank circuit. A regulator circuitry may also be included, which controls the bridge component. The regulator circuitry may execute logic that controls an amount of power that is delivered to the transmitting side resonant tank circuit. Similarly, a current sensing element may be included that informs the regulator circuitry of an amount of current drawn from the power supply.

20 Claims, 4 Drawing Sheets

(56) References Cited

U.S. PATENT DOCUMENTS

| | | |
|---|---|---|
| 9,099,894 B2 | 8/2015 | Azancot et al. |
| 2002/0177884 A1* | 11/2002 | Ahn ........................ A61N 1/08 |
| | | 607/61 |
| 2008/0157603 A1 | 7/2008 | Baarman et al. |
| 2009/0096413 A1* | 4/2009 | Partovi ................... H01F 5/003 |
| | | 320/108 |
| 2011/0215757 A1* | 9/2011 | Tsai ........................ H02J 7/00 |
| | | 320/108 |
| 2013/0154373 A1* | 6/2013 | Lisuwandi .............. H02J 5/005 |
| | | 307/34 |
| 2013/0257168 A1 | 10/2013 | Singh |
| 2015/0108847 A1 | 4/2015 | Taylor et al. |
| 2016/0056664 A1 | 2/2016 | Partovi |

* cited by examiner

SYSTEM AND APPARATUS FOR INDUCTIVE CHARGING OF A HANDHELD DEVICE

FIELD OF THE INVENTION

The present application relates generally to systems and apparatus for inductive charging of a handheld device and specifically to embodiments of a wireless charging system that provides power to the handheld device.

BACKGROUND OF THE INVENTION

There is a current trend towards high-power wireless energy transfer systems for charging handheld devices, such as toothbrushes and mobile phones. These systems typically allow energy transfer from a few watts to charge mobile phones up to a few kilo-watts to charge electric vehicles. Higher transmitted power levels typically require more extensive technical measures for safety and usually require a higher efficiency to comply with energy regulations. When charging an electric vehicle a wireless power transfer system must deliver a few kilo-watts of power to charge the battery in a reasonable time. In that case the efficiency usually must be higher than 90% to keep the generated heat and the additional power cost within limits. Also wireless power transfer systems designed for mobile phones are usually designed to provide a pretty good efficiency of up to 70% but also to provide a constant output voltage. However, neither such a high efficiency nor a constant voltage output and nor an output power as higher than 5 watt is needed to charge a battery of a low cost handheld device like a toothbrush or a shaver.

Accordingly, a need exists in the industry for a low cost charging system that realizes efficiency in the range of 15%-50% and provides power in the range of 250 milli-Watts and 5 Watts.

SUMMARY OF THE INVENTION

Included are embodiments of a wireless charging device. Some embodiments include a transmitting side resonant tank circuit that includes a transmitting side tank capacitor and a primary transmission coil. Also included is a bridge component that is coupled to the transmitting side resonant tank circuit for driving the transmitting side resonant tank circuit. The bridge component may be configured to receive a voltage from a power supply for supplying a rail of the transmitting side resonant tank circuit. A regulator circuitry may also be included, which controls the bridge component. The regulator circuitry may execute logic that controls an amount of power that is delivered to the transmitting side resonant tank circuit. Similarly, a current sensing element may be included that informs the regulator circuitry of an amount of current drawn from the power supply.

Also included are embodiments of a charging system. These embodiments may include a handheld device, where the handheld device includes a battery that stores energy. The embodiments may also include a charging device that includes a transmitting side resonant tank circuit that includes a transmitting side tank capacitor and a primary transmission coil, where the primary transmission coil is coupled in series resonance with the transmitting side tank capacitor. The primary transmission coil may create an alternating magnetic field that is inductively coupled to a receiver coil on the handheld device that is utilized to charge the battery of the handheld device. The charging device may also include a bridge component that includes a plurality of switching elements and is coupled to the transmitting side resonant tank circuit, where the bridge component receives a voltage from the power supply and supply a rail of the transmitting side resonant tank circuit. The charging device may also include a regulator circuitry that is coupled to the bridge component, where the regulator circuitry executes logic that causes the charging device to control the power that is transmitted to the transmitting side resonant tank circuit.

Also included are embodiments of a charging device. Some embodiments of the charging device include a power supply for providing a predetermined voltage and a transmitting side resonant tank circuit that includes a transmitting side tank capacitor and a primary transmission coil, where the primary transmission coil is coupled with the transmitting side resonant tank capacitor, and where the primary transmission coil receives power from the power supply to create an alternating magnetic field that is inductively coupled to a receiver coil on a handheld device that is utilized to charge a battery of the handheld device. Also included is a half bridge that includes a plurality of switching elements and is coupled to the primary transmission tank circuit, where the half bridge receives the predetermined voltage from the power supply and supply a rail of the transmitting side resonant tank circuit. Some embodiments may also include a regulator circuitry that is coupled to the half bridge, where the regulator circuitry executes logic that causes the charging device to control the power that is transmitted to the transmitting side resonant tank circuit.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION OF THE INVENTION

Figure 1:
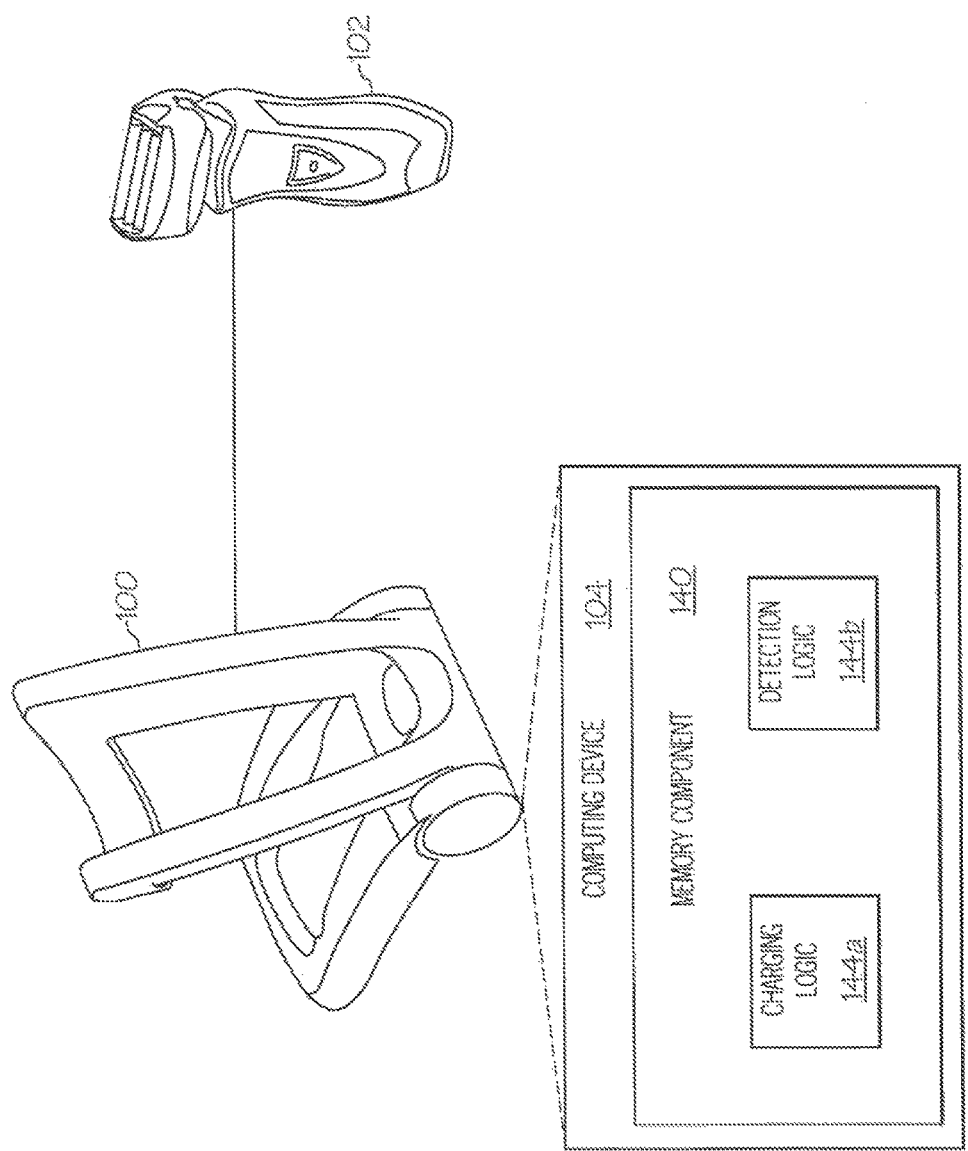
FIG. 1 depicts a system for charging a handheld device, according to embodiments disclosed herein.

Embodiments disclosed herein include systems and apparatus for inductive charging of a handheld device. Specifically, embodiments include a wireless charging device and/or system that are configured to provide between about 0.5 Watts to about 5 Watts and realizes efficiency in the range of about 15% to about 50%. These embodiments may be configured to transmit energy using inductive coupling, while operating the resonant tank circuit at the transmitter side to offset from exact resonance and not at full amplitude. Therefore, an inverter circuit, such as a half-bridge driver (half-bridge), a full-bridge driver (full bridge) and/or other similar circuitry may be used to drive the resonant tank at the transmitter side.

Accordingly, embodiments described herein may be configured to provide an output voltage that is not necessarily constant, as the rechargeable battery may hold the voltage substantially constant by itself. When charging a battery, the load may remain substantially constant until the battery reaches full charge. The result is that embodiments described herein do not need to communicate data between the receiver and transmitter. This removes the need of communication circuitry required in many current solutions.

Embodiments described herein may utilize a regulator circuitry, which may include a computing device such as a microcontroller, and/or other circuitry to control the bridge component that is connected to an inductor/capacitor combination. The regulator circuitry may be configured with charging logic that adjusts the frequency and/or duty cycle of the bridge component. The tolerance of the frequency may depend on the accuracy of the microcontroller's clock, which is often better than 1% compared to what could be reached when using simple oscillator circuits where the frequency depends on many parts and their tolerances of the circuit.

Additionally, embodiments described herein may be configured to measure the current consumption of the transmitter and regulate this current by adjusting the duty cycle. Embodiments may be configured to prevent overload of the power supply that powers the driver and to operate at a certain power point that provides enough power without violating energy regulations. If the power is too low, the required charging times may not be able to be reached. If the power is too high, the power supply may not be able to handle the power, the circuit may become too hot, and/or the system may just operate ineffectively to comply with energy regulations.

Some embodiments may operate at a substantially fixed frequency, which may be adjusted to best match a resonant circuit in the receiver. This fixed receiver operating frequency (e.g., a second frequency) may not match the resonant frequency (e.g., a first frequency) of the transmitter resonant circuit, because the system could become difficult to control under full resonance conditions. Operating too far away from resonance makes the charge inefficient. Hence the transmitter may be configured to operate from about 5% to about 30% above or below the transmitter resonant frequency.

When there is no load (e.g. no receiver is present or the receiver is present, but receiver battery is full and therefore disconnected) the regulation may lead to a different duty cycle than if there is a load. This may be detected and is used to turn off the system to conserve power. At predetermined intervals (e.g., a few seconds), the system may be activated and attempt to detect the load again. If there is no load, the system may return to power save mode. If a load is detected, the system may power the load continuously.

Some embodiments may be configured to distinguish between unwanted loads (e.g., metallic objects) and expected loads. This may be accomplished by having the expected load disconnect or otherwise detune its inductive load for a predetermined amount of time (e.g. 100 milliseconds) at predetermined intervals (e.g. every 60 seconds). This disconnection may be detected by the transmitter and if there is no such short break the load is declared as "unwanted." In response, the power transmission may be stopped.

Some embodiments may also include a feature to detect products that require a different operating frequency and/or a different power requirement. Such products could be detected by analyzing the duty cycle after regulation when such a product is placed on the charger. Additionally, the operating frequency may be altered and the duty cycle determined to better distinguish between the products.

Referring now to the drawings, FIG. 1 depicts a system for charging a handheld device 102, according to embodiments disclosed herein. As illustrated, the charging device 100, such as a wireless charging device, may be configured for receiving a handheld device 102. The handheld device 102 may be configured as an electric razor, electric toothbrush, electric face scrub device, a mobile communication device, and/or other handheld device. As described in more detail below, the charging device 100 may be configured for receiving and inductively charging the handheld device 102. As such, the charging device 100 may include a regulator circuitry 104 that includes a memory component 140, a microcontroller, input/output hardware, etc. The memory component 140 may include any volatile and/or non-volatile storage device, such as RAM, ROM, registers, etc., and may store charging logic 144a and detection logic 144b. The charging logic 144a may be configured to provide charging functionality described herein, while the detection logic 144b may be configured for detecting a load and/or providing other detection functionality described herein.

Figure 2:
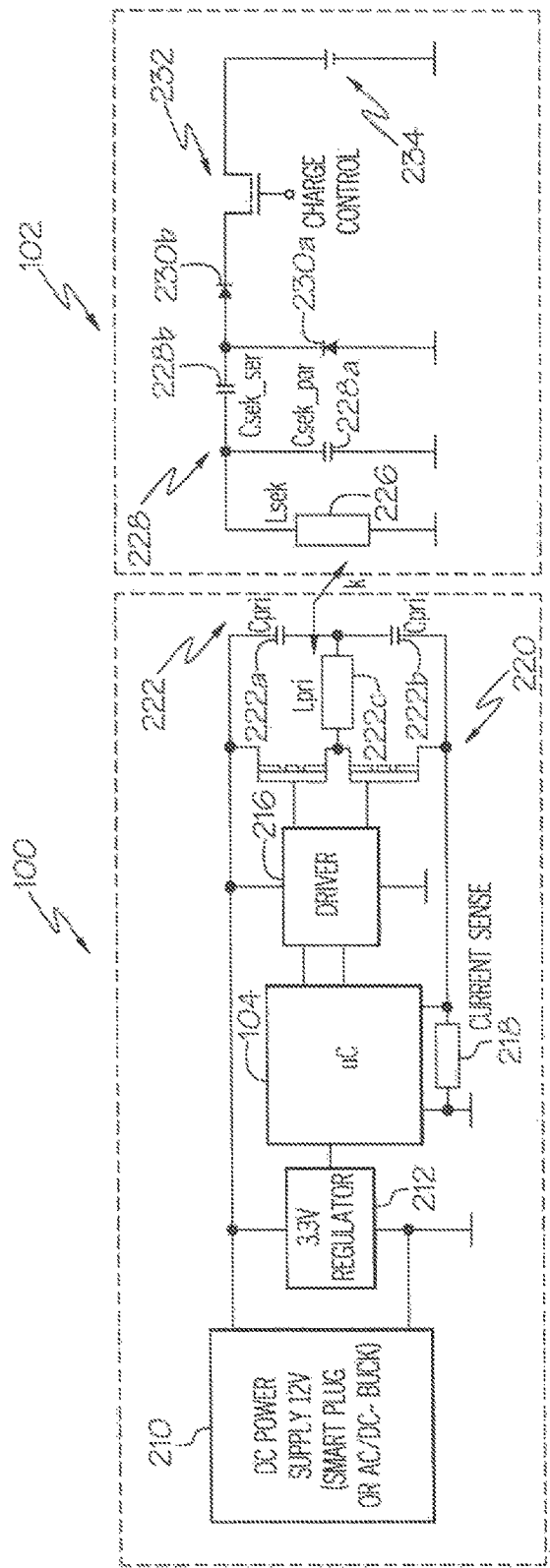
FIG. 2 depicts a plurality of circuit components on a transmitter side and on a receiver side for charging a handheld device, according to embodiments described herein.

FIG. 2 depicts a plurality of circuit components on a transmitter side and on a receiver side for charging a handheld device, according to embodiments described herein. As illustrated, the charging device 100 includes a power supply 210, a voltage regulator 212, the regulator circuitry 104, a driver 216, a current sensing element 218, a bridge component 220, and a transmitting side resonant tank circuit 222, which may include a plurality of capacitors, such as transmitting side tank capacitors 222a and 222b, and a primary transmission coil 222c.

Also depicted in FIG. 2 is the handheld device 102, which may include a receiver coil 226, a plurality of receiving side tank capacitors 228a, 228b, a plurality of diodes 230a, 230b, a charge control switch 232, and a battery 234.

Specifically, the power supply 210 may be configured as any power component for supplying power to a handheld device 102. As an example, the power supply 210 may be configured to provide an intermediate voltage of about 12 Volts to the remainder of the power transmitter circuit. However, the output of the power supply 210 may vary from about 5 Volts to about 40 volts, depending on the embodiment. Some embodiments may also utilize a switch-mode power supply and/or a non-galvanically isolated step-down converter. In some embodiments, the power supply 210 may be limited to providing a predetermined amount of current (e.g. about 250 Milli-Amperes). In such embodiments, the regulator circuitry 104 may be configured to control the bridge component 220 with the transmitting side resonant tank circuit 222 in a way that the current draw stays below about 250 Milli-Amperes.

Also included is the voltage regulator 212. The voltage regulator 212 may be configured to regulate the power provided by the power supply 210 to the regulator circuitry 104. Depending on the embodiment, the voltage regulator 212 may be configured to regulate the power to about 3.3 Volts. In embodiments where the power supply 210 substantially matches the requirements of the regulator circuitry 104, the voltage regulator 212 may be omitted.

As discussed above, the regulator circuitry 104 may include a microcontroller, which may include the memory component 140, a processor, timer, and/or other computing components for providing the functionality described herein. As described above, the memory component 140 may store logic, such as the charging logic 144a and the detection logic 144b. The charging logic 144a may cause the regulator circuitry 104 to control the bridge component 220 as described above and/or perform other charging-related functions. The detection logic 144b may cause the regulator circuitry 104 to detect when a load is present, when a load is unwanted, etc.

As an example, the charging logic 144a may cause the regulator circuitry 104 to drive the bridge component 220 with a predetermined duty cycle and a predetermined amount of power drawn from the power supply 210. Consequently, the regulator circuitry 104 may include and/or be coupled to a current measurement device, such as a shunt resistor, or other similar device that is configured to receive a signal that the wireless charging device is not coupled to the load. When the load (e.g., the handheld device 102) is active and in proximity of the primary transmission coil 222c, the current may be different than without a load. The detection logic 144b may cause the regulator circuitry 104 to detect whether a load is present and cause the charging device 100 to enter a lower power mode if no load (or an unwanted load) is detected. From at predetermined intervals, the regulator circuitry 104 may activate the driver 216, and may then test for a load again.

Depending on the particular embodiment, the regulator circuitry 104 may not be capable to supply enough power and voltage at its output pins to control the bridge component 220 directly. In these embodiments, the driver 216 may be utilized. In embodiments where the regulator circuitry 104 is capable to supply enough power and voltage to control the bridge component 220, a driver 216 may be excluded from the charging device 100.

The bridge component 220 may include one or more transistors, such as MOSFETs. In at least one embodiment of a half bridge, no more than one MOSFET is active at any time to avoid short circuit. The bridge component 220 may be configured to apply positive and/or negative rail of the supply to the transmitting side resonant tank circuit 222, which stores a predetermined amount of energy. By adjusting the duty cycle, the amount of energy added to the transmitting side resonant tank circuit 222 in every cycle can be controlled and the average current draw of the circuit from the power supply 210 can be adjusted.

The transmitting side resonant tank circuit 222 may include the primary transmission coil 222c connected in series and/or parallel resonance to the capacitors 222a, 222b. The alternating magnetic field from the primary transmission coil 222c is inductively coupled to the receiver coil 226 and can therefore transmit energy to the receiver coil 226. The receiver coil 226 forms together with the capacitors 228a, 228b a receiving side resonant tank circuit 228, in the handheld device 102. The receiving side resonant tank circuit 228 may be configured to amplify the energy draw of the handheld device 102, which improves efficiency even at a low coupling factor.

It should be understood that a parallel resonant tank circuit and/or a series resonant tank circuit may be utilized by fitting/not fitting appropriate capacitors 228a, 228b, based on the capacitors that provide the best performance for the system. Accordingly, some embodiments may be configured such that the resonant frequency of the transmitting side resonant tank circuit 222 is not the same frequency as the resonant frequency of receiving side resonant tank circuit 228. In such embodiments, the regulator circuitry 104 may output a frequency that substantially matches the receiving side resonant tank circuit 228 resonance while the resonance frequency of the transmitting side resonant tank circuit 222 may be about 10% higher or lower. The diodes 230a, 230b may be configured as a rectifier, such as rectifying diodes and may be a minimum requirement to operate the circuit with series resonant configuration and rectifying the received energy. The charge control switch 232 may be configured as a controlled switch, such as a transistor, may open when the battery 234 is fully charged. This stops further charging and damaging the battery 234. As this series resonance circuit the energy is swinging through the battery 234, opening the charge control switch 232 also stops the resonant operation of the handheld device 102, making this condition easy to detect at the charging device 100. The charge control switch 232 may also be utilized for detecting an unwanted load, as described in more detail below.

Figure 3:
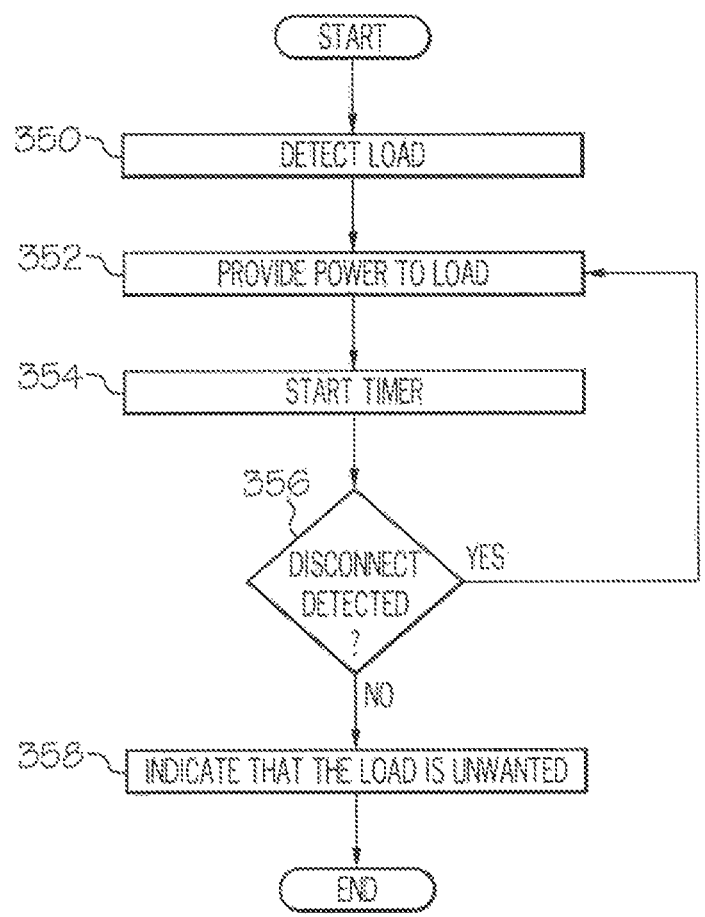
FIG. 3 depicts a flowchart for detecting an unwanted load, according to embodiments described herein.

FIG. 3 depicts a flowchart for detecting an unwanted load, according to embodiments described herein. As illustrated in block 350, a received load may be detected. As described above, the load may include the handheld device 102 of FIG. 1, which may include the battery 234 of FIG. 2, to be charged. In block 352, power may be provided to the load. In block 354, a timer may be started. In block 356, a determination may be made regarding whether the load has been disconnected from the charging device 100 of FIG. 1 according to a predetermined pattern. Specifically, a desired load (or an expected load) may be configured to stop the power receiving by opening the charge control switch 232 of FIG. 2 or by detuning or disconnecting the resonant circuit components for a predetermined duration at predetermined intervals. An unwanted load or an incompatible device may not be configured to disconnect according to this pattern. As such, if the disconnect is not detected, the load is most likely an unwanted load. At block 358, an indication of the status that the load is unwanted may be provided and the disconnection may continue. If the disconnect pattern is detected at block 356, the process may return to block 352.

Figure 4:
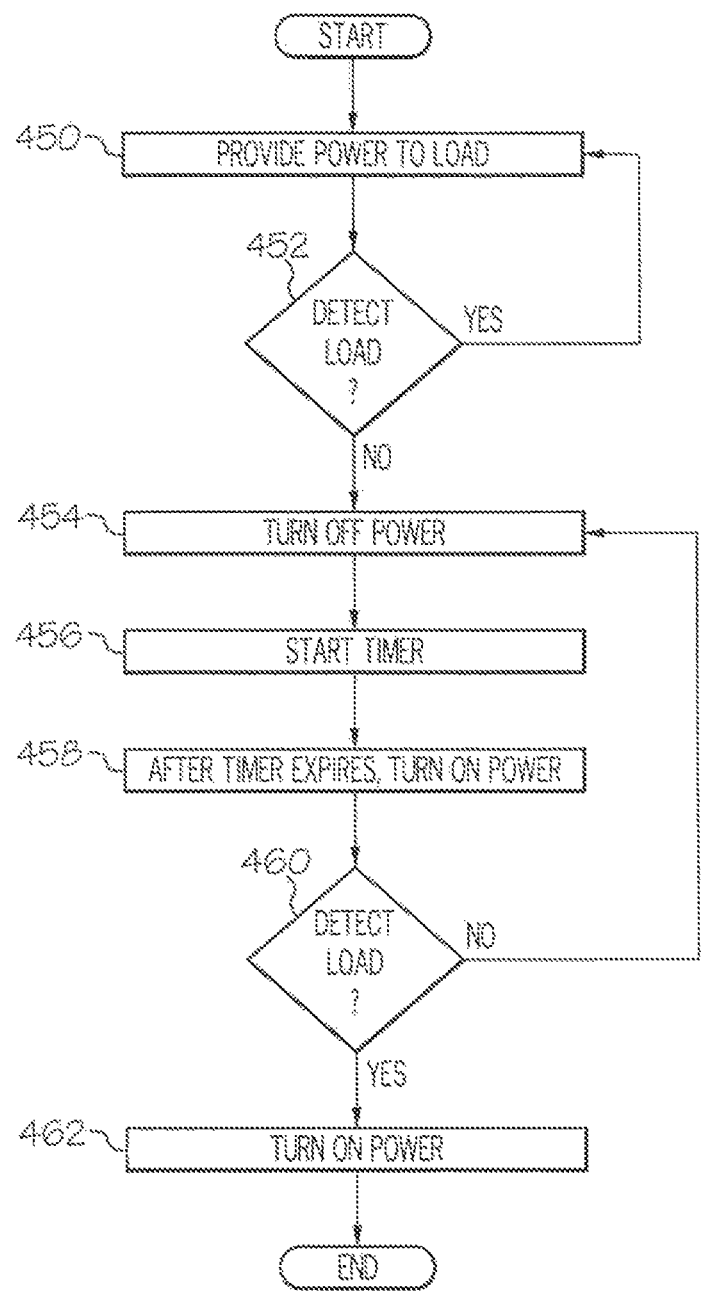
FIG. 4 depicts a flowchart for detecting whether a load is present, according to embodiments described herein.

FIG. 4 depicts a flowchart for detecting whether a load is present, according to embodiments described herein. As illustrated in block 450, power may be provided to the load. In block 452, a determination may be made regarding whether the load is detected. If so, the flowchart may return to block 450. If the load is not detected, in block 454, power may be turned off at the regulator circuitry 104 of the charging device 100 of FIG. 1. In block 456, a timer may be started. In block 458, after the timer expires, power may be turned on at the charging device 100 of FIG. 1. Stated another way, after expiration of the predetermined amount of time, the power may be turned on. In block 460, a determination may be made regarding whether the load is detected. If not, the flowchart returns to block 454. If the load is detected, in block 462, power may be turned on at the charging device 100 of FIG. 1. In some embodiments, the process may restart in response to a detection of the load at block 460.

EXAMPLES/COMBINATIONS

A. A wireless charging device, comprising:
a transmitting side resonant tank circuit that includes a transmitting side tank capacitor and a primary transmission coil, wherein the primary transmission coil is coupled to the transmitting side tank capacitor, wherein the primary transmission coil creates an alternating magnetic field that is inductively coupled to a receiver coil on a handheld device that is utilized to charge a battery in the handheld device;

a bridge component that is coupled to the transmitting side resonant tank circuit for driving the transmitting side resonant tank circuit, wherein the bridge component receives a voltage from a power supply for supplying a rail of the transmitting side resonant tank circuit;

a regulator circuitry that controls the bridge component, wherein the regulator circuitry executes logic that controls an amount of power that is delivered to the transmitting side resonant tank circuit; and a current sensing element that informs the regulator circuitry of an amount of current drawn from the power supply.

B. The wireless charging device of Paragraph A, wherein the wireless charging device is coupled to the handheld device, wherein the handheld device comprises:

the receiver coil that is inductively coupled to the primary transmission coil to receive energy from the wireless charging device;

a plurality of receiving side tank capacitors coupled to the receiver coil to form a receiving side resonant tank circuit for amplifying energy transfer from the wireless charging device; and the battery, wherein the battery is coupled to the receiving side resonant tank circuit via a rectifier, wherein the battery receives and stores the energy received from the wireless charging device, wherein the transmitting side resonant tank circuit is configured to resonate at a first frequency, wherein the receiving side resonant tank circuit is configured to resonate at a second frequency, and wherein the first frequency is different than the second frequency.

C. The wireless charging device of Paragraph A, further comprising a driver that is coupled to the bridge component and which is controlled by the regulator circuitry.

D. The wireless charging device of Paragraph A, further comprising a voltage regulator that supplies power to the regulator circuitry.

E. The wireless charging device of Paragraph A, further comprising:

a current measurement device that receives a signal related to whether the wireless charging device is coupled to a load, wherein, in response to receiving the signal that the wireless charging device is not coupled to the load, the regulator circuitry enters a lower power mode for a predetermined amount of time, wherein after expiration of the predetermined amount of time, the regulator circuitry exits the lower power mode to again determine if the wireless charging device is coupled to the load; and a charge control switch, wherein the regulator circuitry determines whether a received load is different than an expected load, and in response to determining that the received load is different than the expected load, provides output regarding an incompatible device being present.

F. The wireless charging device of Paragraph A, wherein the regulator circuitry controls operating frequency and duty cycle of the bridge component which supplies the transmitting side resonant tank circuit to control energy that is drawn from the power supply.

G. A charging system, comprising:

a handheld device, wherein the handheld device includes a battery that stores energy; and a charging device that comprises:

a transmitting side resonant tank circuit that includes a transmitting side tank capacitor and a primary transmission coil, wherein the primary transmission coil is coupled in resonance with the transmitting side tank capacitor, wherein the primary transmission coil creates an alternating magnetic field that is inductively coupled to a receiver coil on the handheld device that is utilized to charge the battery of the handheld device;

a bridge component that includes a plurality of switching elements and is coupled to the transmitting side resonant tank circuit, wherein the bridge component receives a voltage from a power supply and supply a rail of the transmitting side resonant tank circuit; and a regulator circuitry that is coupled to the bridge component, wherein the regulator circuitry executes logic that causes the charging device to control the power that is transmitted to the transmitting side resonant tank circuit.

H. The charging system of Paragraph G, wherein the handheld device further comprises:

the receiver coil that is inductively coupled to the primary transmission coil to receive energy from the charging device; and a receiving side resonant tank circuit that is coupled to the receiver coil and includes a plurality of capacitors for amplifying energy transfer from the transmitting side resonant tank circuit, wherein the battery is coupled to the receiving side resonant tank circuit and receives and stores the energy received from the charging device.

I. The charging system of Paragraph G, wherein the charging device further includes a current measurement device that receives a signal related to whether the charging device is coupled to a load, wherein, in response to receiving the signal that the charging device is not coupled to the load, the regulator circuitry enters a lower power mode for a predetermined amount of time, wherein after expiration of the predetermined amount of time, the regulator circuitry exits the lower power mode to again determine if the charging device is coupled to the load, and wherein the regulator circuitry further determines whether a received load is different than an expected load, and in response to determining that the received load is different than the expected load, providing output regarding an incompatible device being present.

J. The charging system of Paragraph G, wherein the regulator circuitry controls operating frequency and duty cycle of the bridge component to control energy that is that is drawn from the power supply.

K. The charging system of Paragraph G, wherein the bridge component includes at least one of the following: a half bridge and a full bridge.

L. A charging device, comprising:

a power supply for providing a predetermined voltage;

a transmitting side resonant tank circuit that includes a transmitting side tank capacitor and a primary transmission coil, wherein the primary transmission coil is coupled with the transmitting side tank capacitor, wherein the primary transmission coil receives power from the power supply to create an alternating magnetic field that is inductively coupled to a receiver coil on a handheld device that is utilized to charge a battery of the handheld device;

a half bridge that includes a plurality of switching elements and is coupled to the transmitting side resonant tank circuit, wherein the half bridge receives the predetermined voltage from the power supply and supply a rail of the transmitting side resonant tank circuit; and a regulator circuitry that is coupled to the half bridge, wherein the regulator circuitry executes logic that causes the charging device to control the power that is transmitted to the transmitting side resonant tank circuit.

M. The charging device of Paragraph L, further comprising the handheld device, wherein the handheld device comprises:
  the receiver coil that is inductively coupled to the primary transmission coil to receive energy from the charging device;
  a receiving side resonant tank circuit that is coupled to the receiver coil and includes a plurality of capacitors for amplifying energy transfer from the transmitting side resonant tank circuit; and
  the battery, wherein the battery is coupled to the receiving side resonant tank circuit, wherein the battery receives and stores the energy received from the charging device.
N. The charging device of Paragraph L, wherein the regulator circuitry further determines whether a received load is different than an expected load, and in response to determining that the received load is different than the expected load, providing output regarding an incompatible device being present.
O. The charging device of Paragraph L, wherein the charging device further includes a current measurement device that receives a signal related to whether the charging device is coupled to a load, wherein, in response to receiving the signal that the charging device is not coupled to the load, the regulator circuitry enters a lower power mode for a predetermined amount of time, wherein after expiration of the predetermined amount of time, the regulator circuitry exits the lower power mode to again determine if the charging device is coupled to the load.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wireless charging device, comprising:
  a transmitting side resonant tank circuit that includes a transmitting side tank capacitor and a primary transmission coil, wherein the primary transmission coil is coupled to the transmitting side tank capacitor, wherein the primary transmission coil creates an alternating magnetic field that is inductively coupled to a receiver coil on a handheld device that is utilized to charge a battery in the handheld device;
  a bridge component that is coupled to the transmitting side resonant tank circuit for driving the transmitting side resonant tank circuit, wherein the bridge component receives a voltage from a power supply for supplying a rail of the transmitting side resonant tank circuit;
  a regulator circuitry that controls the bridge component, wherein the regulator circuitry executes logic that controls an amount of power that is delivered to the transmitting side resonant tank circuit; and
  a current sensing element that informs the regulator circuitry of an amount of current drawn from the power supply.

2. The wireless charging device of claim 1, wherein the wireless charging device is coupled to the handheld device, wherein the handheld device comprises:
  the receiver coil that is inductively coupled to the primary transmission coil to receive energy from the wireless charging device;
  a plurality of receiving side tank capacitors coupled to the receiver coil to form a receiving side resonant tank circuit for amplifying energy transfer from the wireless charging device; and
  the battery, wherein the battery is coupled to the receiving side resonant tank circuit via a rectifier, wherein the battery receives and stores the energy received from the wireless charging device.

3. The wireless charging device of claim 2, wherein the transmitting side resonant tank circuit is configured to resonate at a first frequency, wherein the receiving side resonant tank circuit is configured to resonate at a second frequency, and wherein the first frequency is different than the second frequency.

4. The wireless charging device of claim 1, further comprising a driver that is coupled to the bridge component and which is controlled by the regulator circuitry.

5. The wireless charging device of claim 2, wherein the transmitting side resonant tank circuit is operated at a frequency that approximately matches a resonance frequency of the receiving side resonant tank circuit.

6. The wireless charging device of claim 1, further comprising a voltage regulator that supplies power to the regulator circuitry.

7. The wireless charging device of claim 1, further comprising a current measurement device that receives a signal related to whether the wireless charging device is coupled to a load, wherein, in response to receiving the signal that the wireless charging device is not coupled to the load, the regulator circuitry enters a lower power mode for a predetermined amount of time, wherein after expiration of the predetermined amount of time, the regulator circuitry exits the lower power mode to again determine if the wireless charging device is coupled to the load.

8. The wireless charging device of claim 7, further comprising a charge control switch, wherein the regulator circuitry determines whether a received load is different than an expected load, and in response to determining that the received load is different than the expected load, provides output regarding an incompatible device being present.

9. The wireless charging device of claim 1, wherein the regulator circuitry controls operating frequency and duty cycle of the bridge component which supplies the transmitting side resonant tank circuit to control energy that is drawn from the power supply.

10. A charging system, comprising:
  a handheld device, wherein the handheld device includes a battery that stores energy; and a charging device that comprises:
- a transmitting side resonant tank circuit that includes a transmitting side tank capacitor and a primary transmission coil, wherein the primary transmission coil is coupled in resonance with the transmitting side tank capacitor, wherein the primary transmission coil creates an alternating magnetic field that is inductively coupled to a receiver coil on the handheld device that is utilized to charge the battery of the handheld device;
- a bridge component that includes a plurality of switching elements and is coupled to the transmitting side resonant tank circuit, wherein the bridge component receives a voltage from a power supply and supply a rail of the transmitting side resonant tank circuit; and
- a regulator circuitry that is coupled to the bridge component, wherein the regulator circuitry executes logic that causes the charging device to control the power that is transmitted to the transmitting side resonant tank circuit.

11. The charging system of claim 10, wherein the handheld device further comprises:
- the receiver coil that is inductively coupled to the primary transmission coil to receive energy from the charging device; and
- a receiving side resonant tank circuit that is coupled to the receiver coil and includes a plurality of capacitors for amplifying energy transfer from the transmitting side resonant tank circuit,
- wherein the battery is coupled to the receiving side resonant tank circuit and receives and stores the energy received from the charging device.

12. The charging system of claim 10, wherein the charging device further comprising a driver that is coupled to the bridge component and is controlled by the regulator circuitry.

13. The charging system of claim 10, wherein the charging device further includes a voltage regulator that is coupled to the regulator circuitry for providing power to the regulator circuitry.

14. The charging system of claim 10, wherein the charging device further includes a current measurement device that receives a signal related to whether the charging device is coupled to a load, wherein, in response to receiving the signal that the charging device is not coupled to the load, the regulator circuitry enters a lower power mode for a predetermined amount of time, wherein after expiration of the predetermined amount of time, the regulator circuitry exits the lower power mode to again determine if the charging device is coupled to the load.

15. The charging system of claim 14, wherein the regulator circuitry further determines whether a received load is different than an expected load, and in response to determining that the received load is different than the expected load, providing output regarding.

16. The charging system of claim 10, wherein the regulator circuitry controls operating frequency and duty cycle of the bridge component to control energy that is drawn from the power supply.

17. The charging system of claim 10, wherein the bridge component includes at least one of the following: a half bridge and a full bridge.

18. A charging device, comprising:
- a power supply for providing a predetermined voltage;
- a transmitting side resonant tank circuit that includes a transmitting side tank capacitor and a primary transmission coil, wherein the primary transmission coil is coupled with the transmitting side tank capacitor, wherein the primary transmission coil receives power from the power supply to create an alternating magnetic field that is inductively coupled to a receiver coil on a handheld device that is utilized to charge a battery of the handheld device;
- a half bridge that includes a plurality of switching elements and is coupled to the transmitting side resonant tank circuit, wherein the half bridge receives the predetermined voltage from the power supply and supply a rail of the transmitting side resonant tank circuit; and
- a regulator circuitry that is coupled to the half bridge, wherein the regulator circuitry executes logic that causes the charging device to control the power that is transmitted to the transmitting side resonant tank circuit.

19. The charging device of claim 18, further comprising the handheld device, wherein the handheld device comprises:
- the receiver coil that is inductively coupled to the primary transmission coil to receive energy from the charging device;
- a receiving side resonant tank circuit that is coupled to the receiver coil and includes a plurality of capacitors for amplifying energy transfer from the transmitting side resonant tank circuit; and
- the battery, wherein the battery is coupled to the receiving side resonant tank circuit, wherein the battery receives and stores the energy received from the charging device.

20. The charging device of claim 18, wherein the regulator circuitry further determines whether a received load is different than an expected load, and in response to determining that the received load is different than the expected load, providing output regarding an incompatible device being present.

* * * * *